Jan. 30, 1945. H. T. LAMBERT 2,368,417
DISK BRAKE
Filed March 6, 1944 4 Sheets-Sheet 1

Inventor
Homer T. Lambert
By Robb & Robb
Attorneys

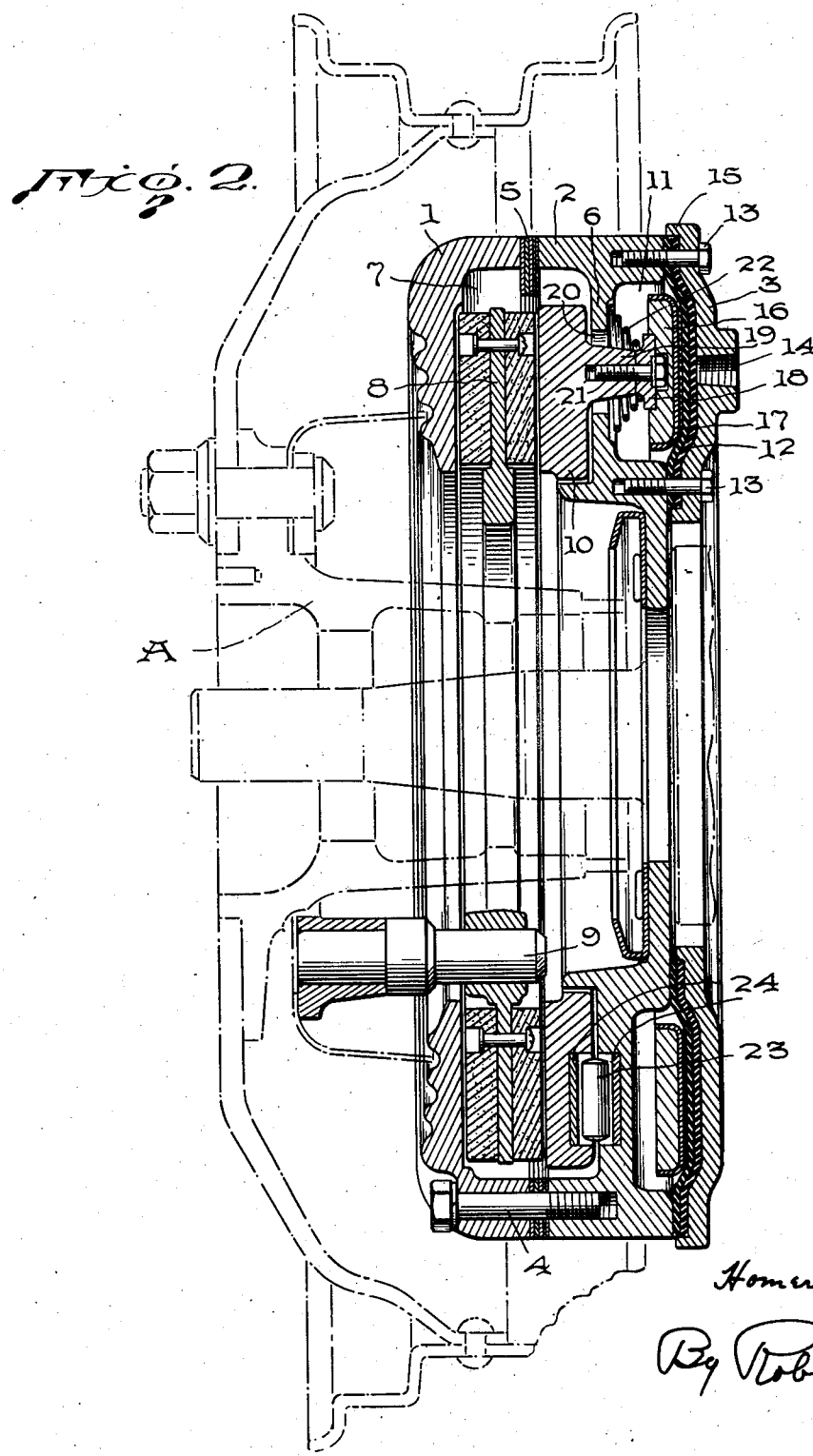

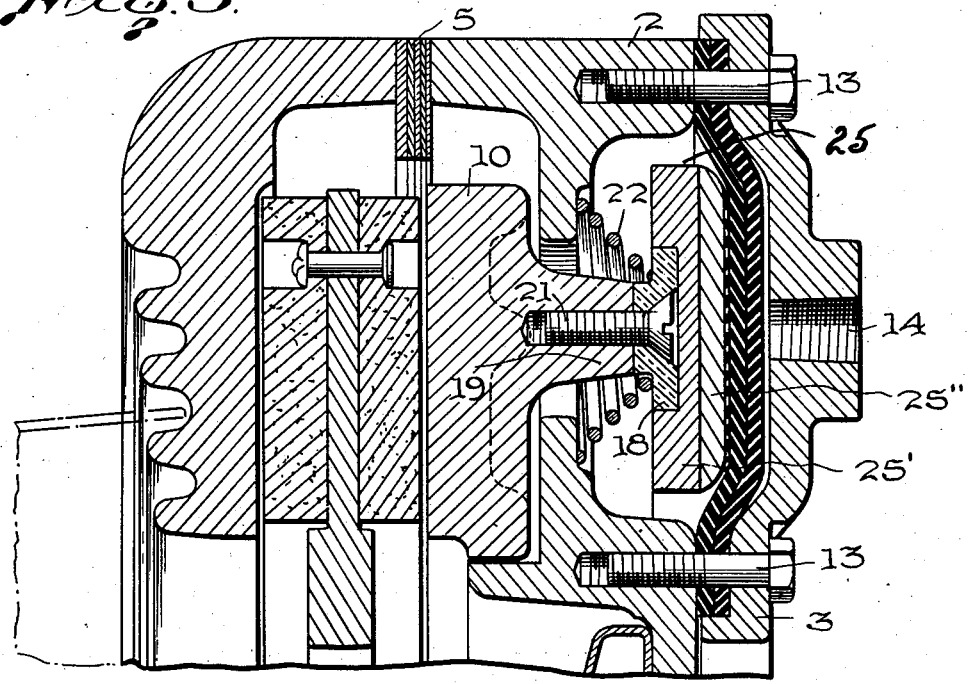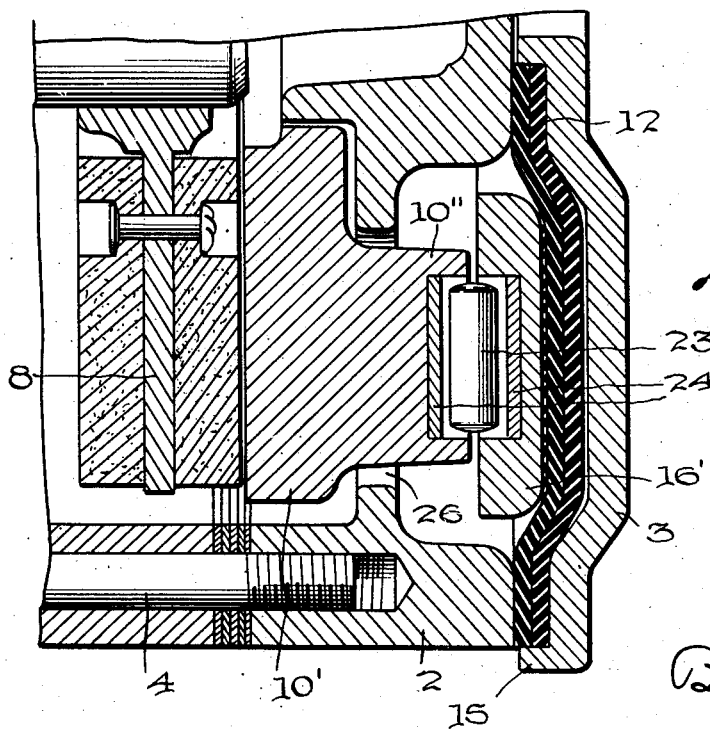

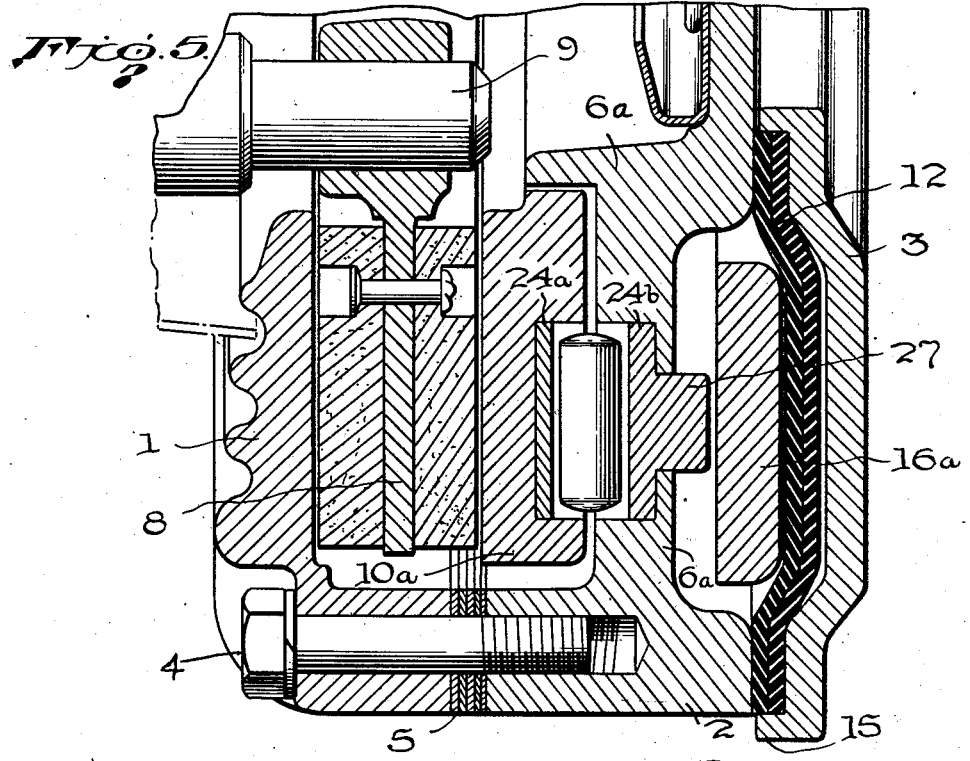
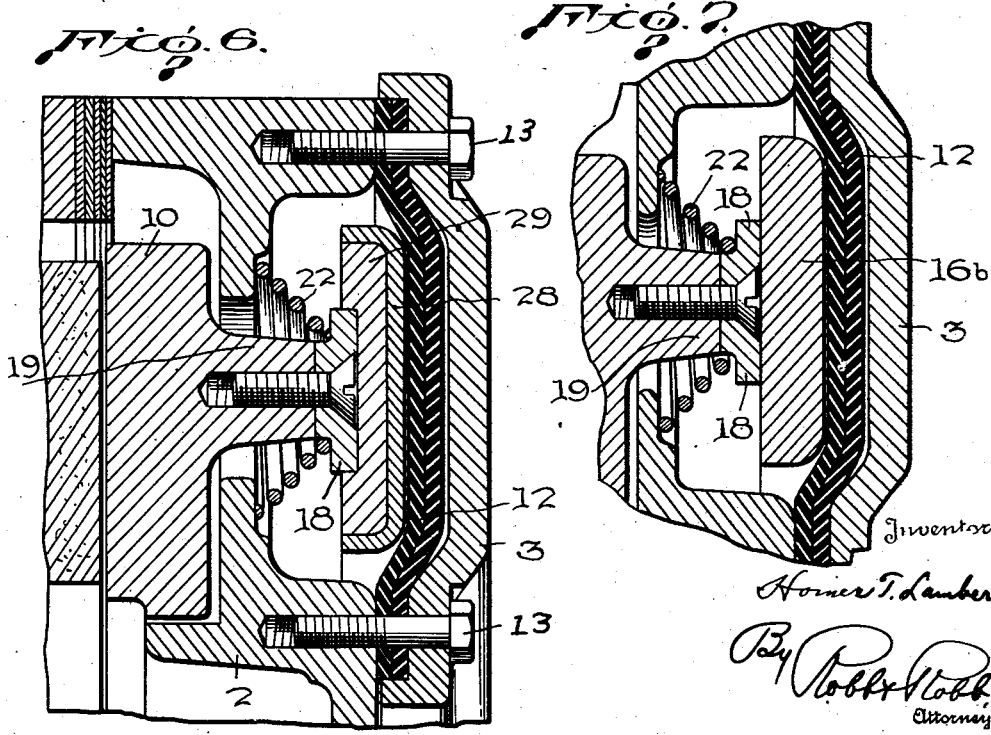

Patented Jan. 30, 1945

2,368,417

UNITED STATES PATENT OFFICE 2,368,417

DISK BRAKE

Homer T. Lambert, St. Joseph, Mich., assignor to Lambert Brake Corporation, St. Joseph, Mich., a corporation of Michigan Application March 6, 1944, Serial No. 525,186

8 Claims. (Cl. 188—72)

This invention appertains to certain improvements in brake mechanisms of the pneumatic disk type, designed particularly for heavy duty service, such as for use in automobiles of the passenger car type, buses, trucks and heavy industrial machinery.

The object of these improvements is to provide a brake unit of simple yet efficient construction with its parts so arranged as to require a minimum amount of care and adjustment and fully protected against access of water, snow or dirt.

These improvements constitute modifications developed in the brake mechanism of my copending application Serial No. 483,191, filed April 15, 1943, now Patent No. 2,354,385, granted July 25, 1944, and have specific reference to the provision of novel means for insulating the diaphragm against the heat of braking friction; an arrangement of the parts to facilitate assembly and disassembly, and other features more particularly pointed out and claimed hereinafter.

In the drawings:

Figure 2 is a vertical sectional view taken about on the plane indicated by the line 2—2 of Figure 1;

Figure 3 is an enlarged fragmentary sectional view showing particularly the form of the pressure plate and extensions between it and the actuating ring cooperating with the flexible diaphragm;

Figure 4 is a view similar to Figure 3 showing the servo or energizing roller-cam arrangement between the rigid actuating ring and pressure plate;

Figure 5 is also an enlarged fragmentary sectional view showing a modification of the roller-cam arrangement mounted partially in the brake casing partition and extending therethrough for cooperation with the actuating ring; and Figures 6 and 7 are enlarged fragmentary sectional views showing modifications of the actuating ring for insulation purposes.

Like reference characters designate corresponding parts in the several figures of the drawings.

Figure 1:
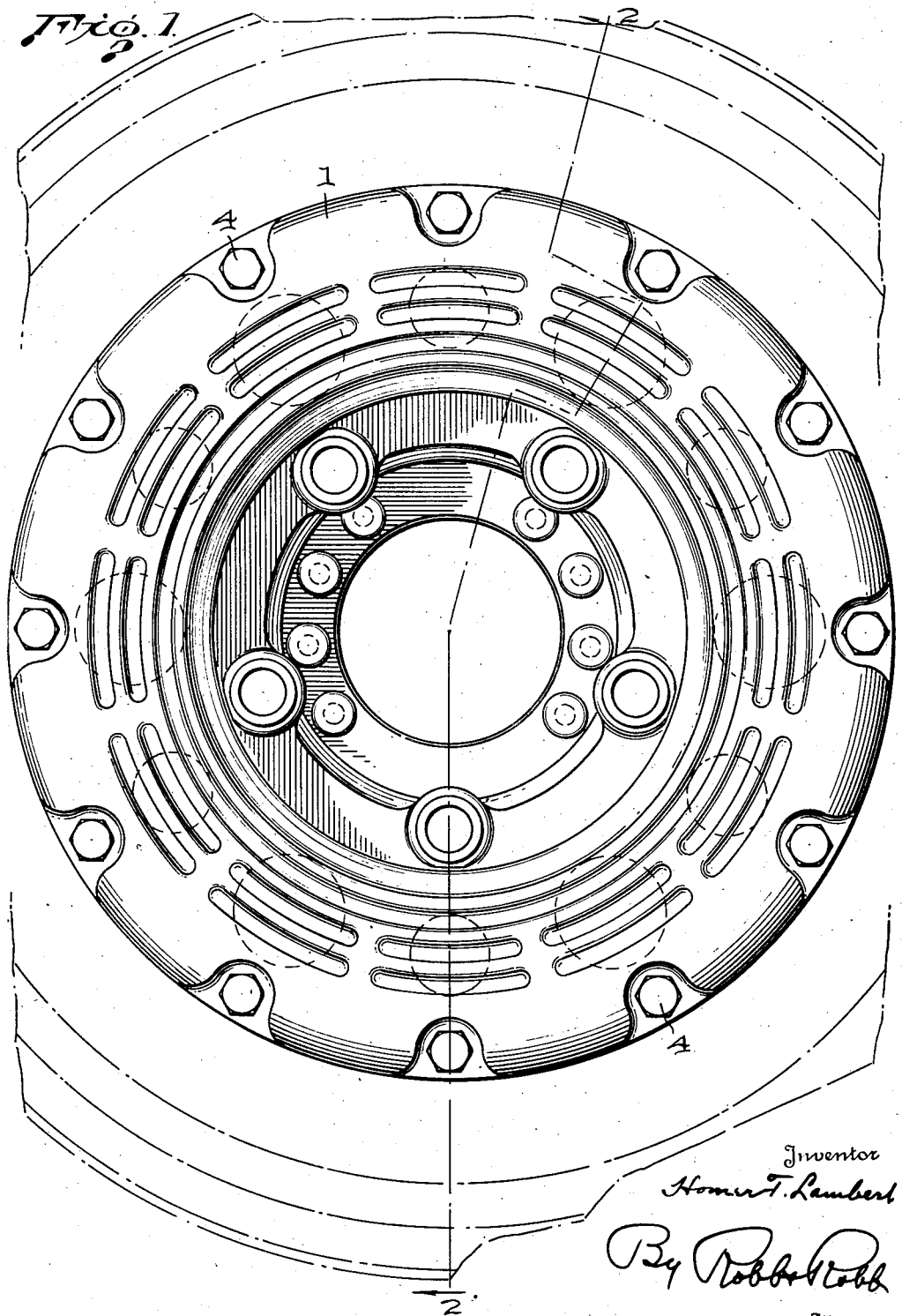
Figure 1 is an end elevation of a brake constructed in accordance with this invention and showing more clearly the arrangement of the heat radiating ribs on the outer face of the backing plate, opposed to the inner friction surface.

Since the invention hereof resides in the brake unit per se, the wheel mounting for the same needs no particular description, being shown generally only in dot and dash lines at A in Figure 2 of the drawings, and resembling the mounting disclosed in my co-pending application hereinbefore referred to.

The brake unit above mentioned is composed of a drum-like casing consisting of the end section 1, the intermediate section 2, and the cover section 3. The first two sections are connected together by the bolts 4, and between these two sections I position a plurality of shims 5, which, as hereinafter disclosed, enable the adjustment of friction parts of the brake mechanism mounted within the casing.

It will be observed that the section 2 is formed with an internal web 6 extending about the hub mounting, and this with the dished end 1 forms a chamber 7 at one side of the web in which is mounted the rotary friction disc 8, slidably carried by the studs 9 of the wheel mounting. In this chamber 7 is also mounted the pressure plate or disc 10, the face of which cooperates with the rotary disk in the braking action hereinafter described.

The web 6 of the intermediate section 2 forms, with the cover 3, a second chamber 11 at the other side similar to the construction disclosed in my co-pending application, and in this second chamber is mounted the flexible diaphragm 12 secured to the inner section and the web thereof by means of the annular rows of bolts 13. This diaphragm, annular in form, is dished to conform to the shape of the cover plate 3 through which is provided the air inlet 14. Moreover, the cover plate 3 is flanged at its outer periphery, as indicated at 15, to extend over the edges of the diaphragm and thereby effectively seal the diaphragm from moisture or water and against the escape of the air when this is introduced to actuate the diaphragm in brake operations.

In order to transmit the movements of the diaphragm to the pressure plate 10, I have found it desirable to employ the rigid ring 16 which may be made of any suitable material, such as aluminum or steel. However, in the form of the construction shown in Figure 2, this ring may be of non-metallic or rigid insulating material covered by a metal facing 17, and this facing is cemented or glued to the contiguous face of the diaphragm. On the opposite face of the ring 16 to that of the metal covering 17, suitable recesses are formed to receive the heads or buttons 18 secured to protuberances 19 extending through the web openings 20 by means of the bolts 21. The buttons 18 are also preferably of insulating material so as to insure against the transfer of heat from the pressure plate 10 to the diaphragm. In heavy braking operations, this heat is quite intense, but by the expedient above referred to, I have effectively prevented this frictional heat from deteriorating the diaphragm material, a rubber composition of the type disclosed in my co-pending application. By recessing the ring 16 to receive the heads of the bolts 21, I have also eliminated the tendency to injure the face of the diaphragm as occurs when the bolts or fastening members extend through the ring. Surrounding the protuberances or posts 19 are arranged conical springs 22 which seat at one of their ends against the web 6 and at their other end against the heads or buttons 18 above referred to.

In the form of the construction of my brake unit illustrated in Figure 2, I arrange the energizing means, consisting of rollers 23 and coacting cam disks 24, 24, between the web 6 and the pressure disk 10.

The operation of the construction of Figure 2 will be obvious from the foregoing description. As air is admitted into the sealed chamber at one side of the diaphragm, the diaphragm moves to the left and through the ring 16 transmits its movement to the pressure disk 10, which, in turn, contacts the face of the rotary member 8 and presses this disk against the friction surface of the end section 1. In this brake operation, the springs 22 are compressed and there is a slight rotation imparted to the disk 10 so as to set up the energizing action of the cam rollers and discs 23, 24, to thereby provide for auxiliary pressure of the braking action. The disc 10, upon relief of the pressure on the diaphragm, is returned to its initial position by the springs 22, which in the initial brake operation are slightly distorted due to the slight rotation of the disk 10 in setting up the energizing action.

In the event of wear taking place in the friction members of this brake, this wear may be compensated for by removal of one or more of the shims 5, and thus a simple method is provided for effecting such repair service.

Passing now to the construction of the brake unit shown in the fragmentary view of Figure 3, it is noted that this construction varies from that described in connection with Figure 2 only in respect to the manner in which the actuating ring 25 is constructed. Here the ring itself 25' may be composed of aluminum or other similar metal on one face of which is secured an insulating member 25''. Otherwise this construction accords with that of Figure 2, and, therefore, the same reference numerals are employed in designating the parts thereof.

In Figure 4 I have illustrated a modified arrangement for the energizing rollers and cam disks 23, 24 respectively. In this form of the construction, these energizing means are mounted between the pressure ring 10' and the actuating ring 10'. To this end, the ring 10' is provided with lateral projections 10'' which extend through openings 26 in the partition or web of the casing section 2. Otherwise, this construction follows that of the previously described arrangements.

Figure 5 discloses another modification of the arrangement of the energizing means, differing from that in Figure 4 in that the disks 24a and 24b are mounted in the adjacent faces of the pressure plate 10a and the web 6a. This web is provided with suitable openings through which extensions or protuberances 27 formed on the camming discs 24b project into close proximity to the actuating ring 16a. As just stated, the space between the ends of the extensions 27 and the ring 16a allow the friction of the pressure disk to start energizing and continue to increase brake pressure during the brake application. That is to say, when the ring 16a contacts with the projections 27, the cam members 24b transmit movement through the rollers and cam members 24a to the disk or plate 10a, and this in turn is shifted into contact with the rotary disc 8 and slight rotary movement is then picked up by the latter, causing reaction pressure on the web 6a to set up the energizing operation. Upon brake release, the parts resume normal position, with the cam members 24b providing a self-adjusting arrangement so as to insure withdrawal of the disc 10a from any dragging contact with the rotary member 8. In order to perform this function freely, there should be sufficient space provided normally between the protuberances 27 and the ring 16a as to prevent any binding action on the rollers between the inserts, for otherwise they would not effect complete release of the brake.

In Figure 6, the actuating ring is composed of a metal channel member 28 in which the insulating material 29 is either molded or placed to prevent the heat of friction of the braking members from affecting the inner surface of the diaphragm 12. The insulating portion 29 of the ring is suitably recessed to accommodate the buttons 18 on the ends of the extensions 19 of the pressure plate 10.

Figure 7 departs from the construction shown in Figure 6 only in relation to the use of a metal actuating ring 16b against the inner face of which the buttons 18 bear, eliminating the seats or recesses for such buttons shown in Figure 6.

While the specific details have been herein shown and described, my invention is not confined thereto, as changes and alterations may be made without departing from the spirit thereof as defined by the appended claims.

What I claim is:

1. A brake unit of the class described, comprising a casing, a rotary disk to be braked therein, a diaphragm in said casing spaced from said rotary disk, friction means intermediate the disk and the diaphragm, an actuating member contiguous to the diaphragm for transmitting movements of the latter to the friction means and rotary disk, and heat insulating means interposed between the actuating member and friction means for preventing transfer of friction heat from the latter to the diaphragm, said friction means consisting of a disk having insulating means carried thereby in contiguous relation to the diaphragm to thereby prevent transfer of friction heat from the friction means to the diaphragm.

2. A brake unit of the class described, comprising a casing, a rotary disk to be braked therein, a diaphragm in said casing spaced from said rotary disk, friction means intermediate the disk and the diaphragm, an actuating member contiguous to the diaphragm for transmitting movements of the latter to the friction means and rotary disk, and heat insulating means interposed between the actuating member and friction means for preventing transfer of friction heat from the latter to the diaphragm, said friction means being provided with lateral protuberances extending toward the diaphragm and said protuberances carrying insulating heads contacting the actuating member to prevent transfer of friction heat from the friction means to the diaphragm.

3. A brake unit of the class described, comprising a casing, a rotary disk to be braked therein, a diaphragm in said casing spaced from said rotary disk, friction means intermediate the disk and the diaphragm, an actuating member contiguous to the diaphragm for transmitting movements of the latter to the friction means and rotary disk, and heat insulating means interposed between the actuating member and friction means for preventing transfer of friction heat from the latter to the diaphragm, said friction means being provided with lateral extensions terminating in heads of insulating material coacting with the actuating member and said actuating member being formed with lateral recesses to receive such extension heads.

4. A brake unit comprising a casing composed of an end section having an internal friction surface, a web section connected to said end section, and a cover section connected to the web section, said web section including a web dividing the casing into two chambers, a rotary disk to be braked and a friction disk mounted in one of said chambers, and a fluid-operating diaphragm mounted in the other of said chambers and connected to the web section by the cover section, said cover section having a peripheral flange extending over the edges of the diaphragm for sealing the space between the diaphragm and the cover section against leakage of the operating fluid.

5. Brake mechanism as set forth in claim 4, combined with removable shims between the end and web sections of the casing to provide for adjustment of the friction disk relative to the rotary disk.

6. Brake mechanism as set forth in claim 4, combined with energizing means mounted between the friction disc and the web section and including projections extending through the web wall of the web section into the diaphragm chamber for actuation by the diaphragm to set up initial servo action in brake applications.

7. A brake unit comprising a casing composed of an end section having an internal friction surface, a web section connected to said end section, and a cover section connected to the web section, said web section including a web dividing the casing into two chambers, a rotary disk to be braked and a friction disk mounted in one of said chambers, a fluid-operated diaphragm and an actuating annulus mounted in the other chamber, said friction disk including lateral projections extending through the web into the diaphragm-containing chamber aforesaid, and servo-energizing means mounted in said diaphragm-containing chamber between the lateral projections and the annulus to space said servo means from the heat developed in brake applications in the disk-containing chamber.

8. A brake unit of the class described, comprising a rotary member to be braked, a friction disk associated with said member, actuating means for shifting said friction disk into contact with the rotary member upon brake application, and energizing means intermediate the friction disc and the actuating means which upon contact with the latter first moves the friction disc into contact with the rotary member to impart slight rotation to the disk and hereafter set up auxiliary pressure of said disk on said rotary member, said actuating means comprising a diaphragm operated ring, and the energizing means comprising camming disks disposed to be contacted by the ring upon brake application to thereby provide servo-action of the brake unit.

HOMER T. LAMBERT.